United States Patent
Dunne et al.

(10) Patent No.: US 10,479,068 B2
(45) Date of Patent: Nov. 19, 2019

(54) ADDITIVE MANUFACTURING VERTICAL STAGE FOR MOVING PHOTOCURED MATERIAL IN A NON-PERPENDICULAR DIRECTION FROM THE IMAGE PLANE

(71) Applicant: 3D Systems, Inc., Rock Hill, SC (US)

(72) Inventors: Patrick Dunne, Lafayette, CA (US); Peter Scott Turner, Venice, CA (US); Seth Astle, Berkeley, CA (US)

(73) Assignee: 3D Systems, Inc., Rock Hill, SC (US)

( * ) Notice: Subject to any disclaimer, the term of this patent is extended or adjusted under 35 U.S.C. 154(b) by 306 days.

(21) Appl. No.: 15/467,600

(22) Filed: Mar. 23, 2017

(65) Prior Publication Data
US 2017/0274601 A1    Sep. 28, 2017

Related U.S. Application Data

(60) Provisional application No. 62/311,989, filed on Mar. 23, 2016.

(51) Int. Cl.
  *B29C 67/00* (2017.01)
  *B33Y 30/00* (2015.01)
  *B33Y 10/00* (2015.01)

(52) U.S. Cl.
  CPC .............. *B33Y 30/00* (2014.12); *B33Y 10/00* (2014.12)

(58) Field of Classification Search
  CPC .................................................. B29C 54/135
  See application file for complete search history.

(56) References Cited

U.S. PATENT DOCUMENTS

| | | |
|---|---|---|
| 4,575,330 A | 3/1986 | Hull |
| 6,080,343 A | 6/2000 | Kaufman et al. |
| 8,636,938 B2 | 1/2014 | Bonassai et al. |
| 9,360,757 B2 | 6/2016 | DeSimeone et al. |
| 2006/0022379 A1* | 2/2006 | Wicker .................. B33Y 30/00 264/255 |

(Continued)

FOREIGN PATENT DOCUMENTS

| | | |
|---|---|---|
| DE | 4102260 | 7/1992 |
| WO | 2015139094 | 9/2015 |

(Continued)

OTHER PUBLICATIONS

"Phantom Geometry by Kyle von Hasseln aned Liz von Hasseln", The Method Case, www.themethodcase.com/video-phantom-geometry-by-kyle-von-hasseln-and-liz-von-hasseln [retrieved Mar. 23, 2017) (2 pages).

(Continued)

*Primary Examiner* — Joseph A Miller, Jr.

(57) ABSTRACT

There is provided an additive manufacturing system comprising a vertical stage (also known as a z-stage) that moves the object being created along an axis of motion that is not perpendicular to the image plane (non-parallel to the z-axis of the image plane). By moving the build platform, upon which the additively manufactured object is being supported, along a predetermined axis of motion, such as one adapted to the dominant axis of the object design, the additive manufacturing system is capable of making larger objects, shortening build times, improving part resolution, and/or reducing the volume of photocurable material needed, among other benefits.

5 Claims, 2 Drawing Sheets

(56) References Cited

U.S. PATENT DOCUMENTS

| | | | |
|---|---|---|---|
| 2009/0196946 A1* | 8/2009 | Kihara | B33Y 30/00 425/171 |
| 2010/0196526 A1* | 8/2010 | Yasukochi | B29C 64/135 425/174.4 |
| 2015/0044318 A1 | 2/2015 | Ohkusa et al. | |
| 2015/0231824 A1 | 8/2015 | Kobayashi | |
| 2015/0246487 A1 | 9/2015 | El-Siblani | |

FOREIGN PATENT DOCUMENTS

| | | |
|---|---|---|
| WO | 2016053512 | 4/2016 |
| WO | 2016057372 | 4/2016 |

OTHER PUBLICATIONS

PCT International Search Report the International Searching Authority for PCT/US2017/023811, dated Jun. 1, 2017 (Jan. 6, 2017) (7 pages).

PCT Written Opinion of the International Searching Authority for PCT/US2017/023811, dated Jun. 1, 2017 (Jan. 6, 2017) (8 pages).

\* cited by examiner

ADDITIVE MANUFACTURING VERTICAL STAGE FOR MOVING PHOTOCURED MATERIAL IN A NON-PERPENDICULAR DIRECTION FROM THE IMAGE PLANE

CROSS REFERENCE TO RELATED APPLICATIONS

This non-provisional patent application claims priority to U.S. Provisional Application Ser. No. 62/311,989, Entitled "ADDITIVE MANUFACTURING VERTICAL STAGE FOR MOVING PHOTOCURED MATERIAL IN A NON-PERPENDICULAR DIRECTION FROM THE IMAGE PLANE" by Patrick Dunne, filed on Mar. 23, 2016, incorporated herein by reference under the benefit of U.S.C. 119(e).

FIELD OF THE INVENTION

The present invention is related to additive manufacturing, and more particularly, to apparatuses and methods for additive manufacturing systems having a vertical stage that moves in a direction that is not perpendicular to the image plane.

BACKGROUND

Some existing additive manufacturing ("AM," which is also known as 3D printing ("3DP"), freeform fabrication ("FFF"), rapid prototyping ("RP"), and the like) techniques use a digital mirror device (DMD), digital light projector (DLP), laser, or other actinic radiation source to selectively cure photocurable materials. The photocurable materials are typically cured on an image plane defined along the x-axis and y-axis of the AM system. Each cured layer, or portion of a layer, of the x-,y-plane defines a cross-section of the additively manufactured object being made. The object is made such that it is connected, either directly or on a support structure known in the art, to a platform (also known as a build plate or build pad) that is movable along the z-axis using a vertical stage (also known as a z-stage). After a layer is cured, the platform is moved away from the actinic radiation source one layer thickness and a fresh layer of uncured material covers the previously cured layer to allow selective curing of the next layer of the additively manufactured object. The vertical stage for moving the platform of existing AM systems moves only in a linear manner in the direction of the z-axis.

SUMMARY

The various embodiments of the present invention provide a vertical stage that moves in a manner that is not perpendicular to the image plane to enable improved additive manufacturing of objects. By moving the platform along an axis that is not parallel to the z-axis (perpendicular to the x-,y-plane) certain advantages may be obtained, including but not limited to allowing larger objects to be made than would otherwise be possible (based upon the size of the image plane in the x-,y-plane), decreasing the build time for the additively manufactured object, reducing or controlling anisotropy and/or internal stresses within the object, improving the resolution of the object, reducing the amount of support structure required to support the object, and providing other benefits described below.

BRIEF DESCRIPTION OF THE FIGURES

Figure 1:
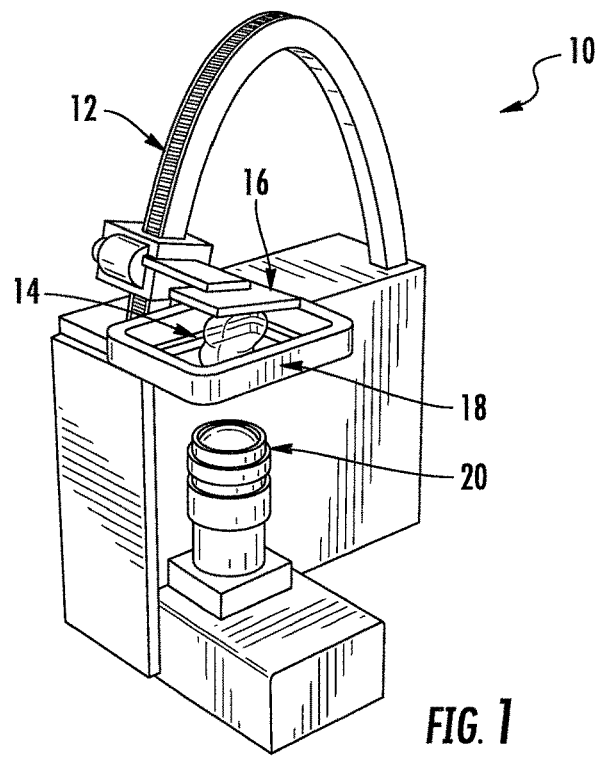

Having thus described the invention in general terms, reference will now be made to the accompanying drawings, which are not necessarily drawn to scale and are meant to be illustrative and not limiting, and wherein:

FIG. 1 is a perspective view of an AM system 10 in accordance with one embodiment of the present invention showing a vertical stage 12 that is generally in the shape of an arch (for making a 3D printed object 14 generally having the shape of an arch), wherein the platform is in a first position above the photocurable material tray. A platform 16, to which the additively manufactured object 14 is attached, is moved by the vertical stage 12 in a direction that is not parallel to a z-axis defined by the image plane in the material tray 18. The actinic radiation source 20 projects actinic radiation onto the image plane, which in the illustrated embodiment is a plane along the x- and y-axes at the interface between the actinic radiation transparent film on the bottom surface of the material tray 18 and the photocurable material within the material tray.

Figure 2:
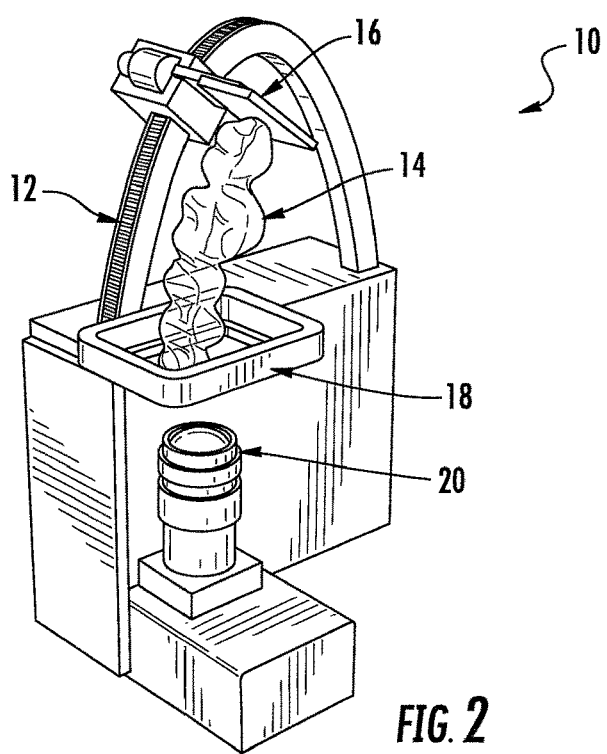

FIG. 2 is a perspective view of the AM system of FIG. 1, wherein the platform is in a second position above the material tray.

Figure 3:
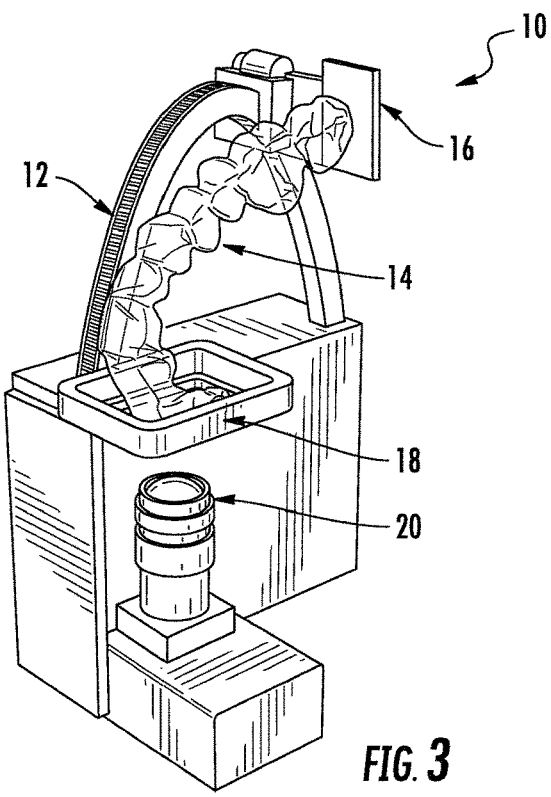

FIG. 3 is a perspective view of the AM system of FIG. 1, wherein the platform is in a third position above the material tray.

Figure 4:
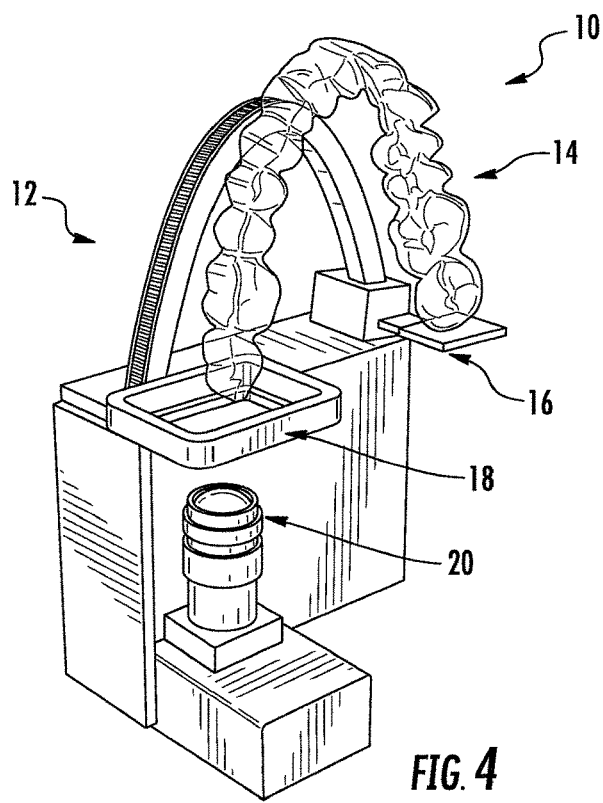

FIG. 4 is a perspective view of the AM system of FIG. 1, wherein the platform is in a fourth position above the material tray showing the completed object (a dental aligner).

DETAILED DESCRIPTION OF THE PREFERRED EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing an additive manufacturing ("AM") system are described and shown in the accompanying drawings with regard to a specific type of vertical stage, it is envisioned that the functionality of the various apparatus and methods may be applied to any now known or hereafter devised vertical stage in which it is desired to provide a custom axis of motion for the vertical stage in order to customize the build process based upon the object design. Like numbers refer to like elements throughout.

With reference to FIGS. 1-4, an AM system in accordance with one embodiment of the present invention is illustrated. The illustrated embodiment is shown with an axis of motion that defines a fixed trajectory (an arch) that corresponds to a dominant axis of the object design, namely the arched axis that runs along the length (albeit curved length) of the illustrated dental aligner. Although the illustrated embodiments represent the additive manufacturing of a dental aligner, it should be appreciated that any object designs can be made with the apparatuses and methods of the present invention, including but not limited to other dental devices such as denture bases, bite guards, drill guides, and the like, other medical devices customized for the patient, environmental control systems ("ECS") thin wall ducting, composite drill jigs, and the like. The present invention is particularly advantageous for object geometries that define a minimal cross-section along a non-linear dominant axis, such that a smaller material tray 18 (also known as a vat or cartridge) can be used to make the object as compared to traditional AM systems.

Turning again to the embodiment of FIGS. 1-4, the AM system 10 includes a vertical stage 12 that is generally in the shape of an arch (for making a 3D printed object 14, namely a dental aligner, generally having the shape of an arch). The platform 16, to which the additively manufactured object 14 is attached, is moved by the vertical stage 12 in a direction that is not parallel to a z-axis defined by the image plane in the material tray 18. Because the illustrated embodiment of the present invention utilizes a bottom-up approach for projecting the actinic radiation through a radiation-transmissive film in the bottom of the material tray 18, the image plane of the illustrated embodiment is defined by the lowermost layer of photocurable material that contacts the radiation-transmissive film. The film in some embodiments is also oxygen transmissive, as known in the art.

The image plane is a plane along the x- and y-axes, with the z-axis extending perpendicular to the image plane. Traditional AM systems include a vertical stage that moves in direction, in other words, defines an axis of motion, that is parallel to the z-axis such that the layers of the additively manufactured object are planar and define a thickness equivalent to the movement of the vertical stage along the z-axis. Conversely, the present invention comprises a vertical stage that moves in a direction (defines an axis of motion) that is not parallel to the z-axis, such that the AM system must compensate for layers defining varying thicknesses across the x-,y-axes of the image plane. For example, the greater the incremental motion of the vertical stage of the present invention varies from the traditional z-axis motion, the greater the variance in thickness across the cured layer, which the AM system compensates for by adjusting the intensity and/or duration of the projected image(s) that cure the photocurable material to form the layer of the object. In the illustrated embodiment of FIGS. 1-4, the portion of cross-sectional layers that define the outer surfaces of the teeth are generally thicker than the portion of the cross-sectional layers defining the inside surfaces of the teeth.

Conventional vertical stages typically comprise a threaded rod that is rotated, such that a nut portion connected to the platform causes the platform to raise or lower along the z-axis (the direction of travel depends upon the direction of rotation of the threaded rod). The vertical stage 12 shown in FIGS. 1-4 comprises a rail shaped as an arch and a motor on the portion that connects to the platform. As the motor is controllably rotated, the platform is moved away from or toward the material tray 18 (the direction of travel depends upon the direction of rotation of the motor). Further embodiments of the present invention comprise a robotic arm that defines as least two degrees of freedom and preferably six degrees of freedom in order to move the platform along a predetermined axis of motion that is based upon the object design, such as the dominant axis of the object design. One advantage to using a robotic arm or other vertical stage that is programmable is that the range of object designs (also called geometries in the art) is much broader when compared to embodiments of the present invention that define an axis of motion that is a fixed trajectory, such as the embodiment of FIGS. 1-4. Still other embodiments of the present invention comprise alternative vertical stages for moving the platform (and previously photocured material) along an axis of motion that is not perpendicular to the image plane (not parallel to the z-axis of the image plane).

The actinic radiation source 20 that projects actinic radiation upon the image plane comprises at least one of a DLP, a DMD, a grating light valve device, LEDs, MEMS, a laser, mask imaging devices, or other actinic radiation sources known in the art or hereafter devised. All known imaging techniques known in the art may be used with the various embodiments of the present invention. The frequency, intensity, duration, and other parameters relating to the actinic radiation are tailored to the particular photocurable material used to make the additively manufactured object. All photocurable materials currently known in the art and that may be developed in the future may be used with the various embodiments of the present invention.

U.S. Pat. No. 4,575,330 to Hull includes some embodiments with a platform that has an additional degree of freedom. In particular, FIGS. 7 and 8 of the '330 patent include a pivot pin or hinge member 42 to enable an "add on" process to selectively form an additional structure 41 on one side of the object.

However, the present invention is distinguishable from the '330 patent because the vertical stage of the '330 patent moves only along the z-axis, like conventional AM systems, and does not define an axis of motion that is not parallel to the z-axis.

An important difference and advantage over the prior art is that the 3D printed object 14 can have a greater lateral dimension than an image plane defined within the material tray 18. A lateral dimension is defined along the x-axis and/or the y-axis and perpendicular to the z-axis. In the embodiment depicted in FIGS. 1-4, the printed object 14 has a lateral dimension defined by the arch-shaped vertical stage 12 that is larger than the same lateral axis of the image plane defined within the material tray 18. If the arch-shaped vertical path is defined along the x- and z-axes, then the dimension of the printed object 14 can have a dimension along the x-axis that is greater than the x-dimension of the image plane. In other embodiments, the vertical stage 12 may have other linear or non-linear paths that are not parallel to the z-axis that allow a printed object to be dimensionally longer than the image plane along two lateral axes. In some embodiments the vertical stage 12 can define a linear trajectory that extends along the x-axis, the y-axis, and the z-axis. In other embodiments the vertical stage 12 can define a non-linear trajectory that extends along the x-axis, the y-axis, and the z-axis. Examples of such a non-linear trajectory can be defined by a stage 12 that has one or more of a circular, elliptical, spiral, hyperbolic, parabolic, and an irregular trajectory. Other examples may be defined by robotic arm with three or more axes of motion.

The various embodiments of the present invention provide many benefits compared to prior art additive manufacturing systems. Such benefits and advantages include but are not limited to enabling larger objects to be made than would otherwise be possible (based upon the size of the image plane in the x-,y-plane), decreasing the build time for the additively manufactured object, reducing or controlling anisotropy and/or internal stresses within the object, improving the resolution of the object, and reducing the amount of support structure required to support the object. The vertical stages of the present invention also allow the use of a smaller image plane (as compared to conventional AM systems that make objects of comparable size and geometry), which enables the actinic radiation source to be zoomed in thus providing (A) higher energy density that (i) speeds up the build time, (ii) provides higher green strength (the strength of the additively manufactured object immediately after the build process and before post-processing), and (iii) allows deeper curing of photocurable materials, particularly filled materials having certain non-curable particles; (B) smaller pixel sizes that (i) provide higher resolution, of both positive and negative features, and (ii) smoother objects surfaces, such that the surfaces are pixel texture free, have no vertical terracing and provide better hygiene and clarity; (C) smaller cross-sections of the additively manufactured object, which (i) enable the AM system to tolerate higher viscosity materials and (ii) result in less hydrostatic tension further resulting in less tensile distortion and faster build speed; and (D) smaller material tray and film, which (i) reduces the cost of the material tray, cartridge, and/or AM system and (ii) reduces the overall size of the AM system.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

Accordingly, the present invention provides for the production of three-dimensional objects with improved speed, sizes, material properties, and the like. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The specific embodiments and applications thereof described above are for illustrative purposes only and do not preclude modifications and variations encompassed by the scope of the following claims.

That which is claimed:

1. An additive manufacturing system for creating an object from cured photocurable material based upon an object design, the additive manufacturing system comprising:
    an actinic radiation source, wherein the actinic radiation source selectively projects actinic radiation generally upwardly that corresponds to cross-sectional areas of the object design;
    a material tray having a bottom surface with a radiation transparent film containing the photocurable material, wherein the projected actinic radiation passes up through the radiation transparent film and defines an image plane along an x-,y-plane above the radiation transparent film within the photocurable material, the image plane defines a z-axis perpendicular to the x-, y-plane;
    a rail that defines a path that is not parallel to the z-axis; and
    a platform upon which the cured photocurable material object is supported above the radiation transparent film, the platform is constrained to move along the path defined by the rail.

2. An additive manufacturing system according to claim 1, wherein the path defined by the rail is non-linear.

3. An additive manufacturing system according to claim 1, wherein the path defined by the rail is an arch-shaped path.

4. An additive manufacturing system according to claim 1, wherein the path defined by the rail corresponds to a non-linear dominant axis of a dental article.

5. An additive manufacturing system according to claim 1, wherein the actinic radiation transparent film is also oxygen transmissive.

* * * * *